(12) United States Patent
Chung et al.

(10) Patent No.: US 6,443,340 B1
(45) Date of Patent: Sep. 3, 2002

(54) SPRING SYSTEM FOR CELLULAR TELEPHONE HOLSTER

(75) Inventors: Kenneth Joseph Chung, Lindenhurst; Mark William Oliver, Arlington Heights, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/598,602

(22) Filed: Jun. 21, 2000

(51) Int. Cl.[7] .............................................. A01K 97/04
(52) U.S. Cl. ....................... 224/197; 224/269; 224/930; 24/505; 248/231.81
(58) Field of Search ................... 224/197, 198, 224/199, 200, 930, 269; 248/231.81, 316.1, 292.13; 24/505; 379/446, 455

(56) References Cited

U.S. PATENT DOCUMENTS 5,988,577 A * 11/1999 Phillips et al. ......... 248/231.81
6,161,741 A * 12/2000 French ...................... 224/198

* cited by examiner

*Primary Examiner*—Stephen K. Cronin
(74) *Attorney, Agent, or Firm*—Paul J. Bartusiak; Randall S. Vaas

(57) ABSTRACT

A cellular telephone holster includes a holster section formed to accept a cellular telephone. A clip portion is rotatably attached to the holster section and formed to have a circular opening with at least one detent along an inner perimeter of the opening. A spring system is coupled to the holster section and includes a substantially incompressible piston and a compressible material separate from and coupled to the substantially incompressible piston. The circular opening is sized to fit around the spring system. The holster section is formed to have at least one protrusion, and the substantially incompressible piston and the compressible material are insertable against the protrusion, whereby the at least one protrusion contributes to holding the substantially incompressible piston and the compressible material in place relative to the holster section.

22 Claims, 4 Drawing Sheets

US 6,443,340 B1

SPRING SYSTEM FOR CELLULAR TELEPHONE HOLSTER

FIELD OF THE INVENTION

This invention generally relates to holsters for carrying portable wireless devices. More specifically, this invention relates to a two piece spring system for a cellular telephone holster.

BACKGROUND OF THE INVENTION

As cellular telephones and other portable, wireless communication devices become smaller and smaller, more and more users choose to carry the devices by fastening them to a holster that is somehow attached to the user's person. The holster has a clip that allows the holster to be attached to a persons belt.

When the holster and phone are attached to a person's belt, the position of the phone may restrict a person's movement. For example, when the person sits, the phone can undesirably protrude into the person's waist. Therefore, prior art clips of cellular telephone holsters contained a mechanism to allow the clip to rotate with respect to the holster so that a person can adjust the phone position.

FIG. 1 shows a portion of a back side of a prior art cellular telephone holster 100. The holster 100 has a holster section 102 and a clip portion 104. The clip portion 104 has protrusions 106 formed to accept a pin (not shown) so that a clip (not shown) can be pivotably attached to the pin. A force applied to the clip causes the clip to open so that the holster 100 can be attached, for example, to the user's belt. A spring (not shown) forces the clip to rest in the closed position when no force is applied to the clip.

The clip portion 104 is formed to have a circular opening 108 with a plurality of detents 114. The holster section 102 is formed to have protrusions 110, an a single, stainless steel leaf spring 112 is insertable between the protrusions 110. In normal assembly, a cap (not shown) is ultrasonic welded to the protrusions 110 to cover the leaf spring 112 assembly, and a clip (not shown) is attached to the clip portion 104. The cap and clip are not shown so as to reveal the leaf spring 112.

When a user applies a sufficient rotating force upon the holster section 100, that causes the holster section 100 to rotate with respect to the clip portion 104. A top portion 116 is forced downward against a bottom portion 118 of the leaf spring as the tip of the top portion 116 contacts one of the protrusions 120 formed by the plurality of detents 114, thereby forcing the bottom portion 118 to compress. When the tip of the top portion 116 comes into contact with another detent of the plurality of detents 114, the bottom portion 118 of the leaf spring 112 expands, and the pressure applied to the top portion 116 against the detent is causes the holster section 102 to remain in the new, rotated position relative to the clip portion 104.

The prior art leaf spring 112 is composed of a metal material such as stainless steel. Moreover, the leaf spring 112 is a single piece of metal material. Accelerated life testing of the leaf spring 112 produces tiny fractures in the metal material which indicates that after a user rotates the prior art holster 100 many times, the spring system may stop working and not hold the holster section 102 in a rotated position. Specifically, the prior art leaf spring 112 receives high stresses in its two corners (area with smallest radii); these stresses exceed the yield strength of the material (stainless steel 410).

In addition, the prior art leaf spring 112 does not provide enough spring force (which equates to turning resistance or torque); it provides only 0.58–1.0 in-lbs of torque. Therefore, what is needed is a reliable, cost effective spring system that allows reliable rotation of cellular telephone coupled to a holster.

BRIEF DESCRIPTION OF THE DRAWINGS

FIG. 4a is a front view of a substantially incompressible piston used in the spring system of FIG. 3;

FIG. 4b is a side view of the substantially incompressible piston of FIG. 4a;

FIG. 5b is a side view of the piston of FIG. 5a;

FIG. 6b is a side view of the compressible material of FIG. 6a; and

FIG. 6c is a top view of the compressible material of FIG. 6a.

In the drawing figures, like numerals represent like components.

DETAILED DESCRIPTION OF PREFERRED EMBODIMENTS

Figure 2:
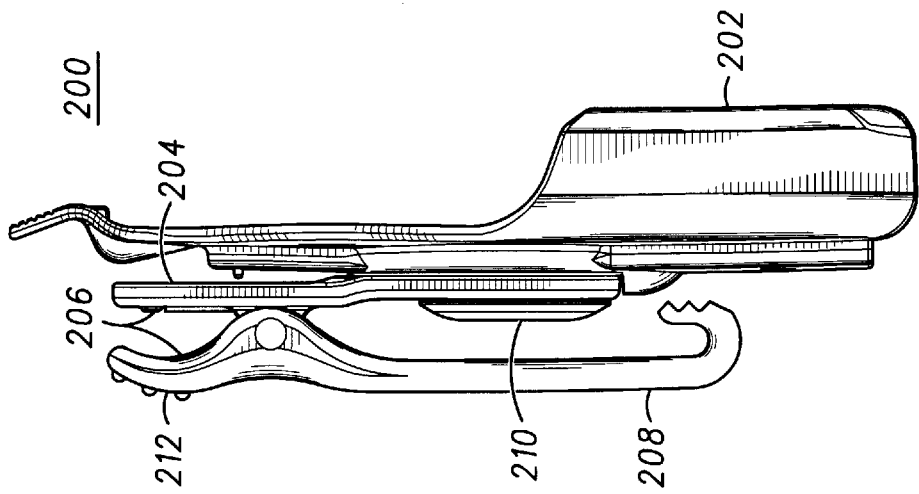
FIG. 2 is an isometric view of a cellular telephone holster.
Figure 1:
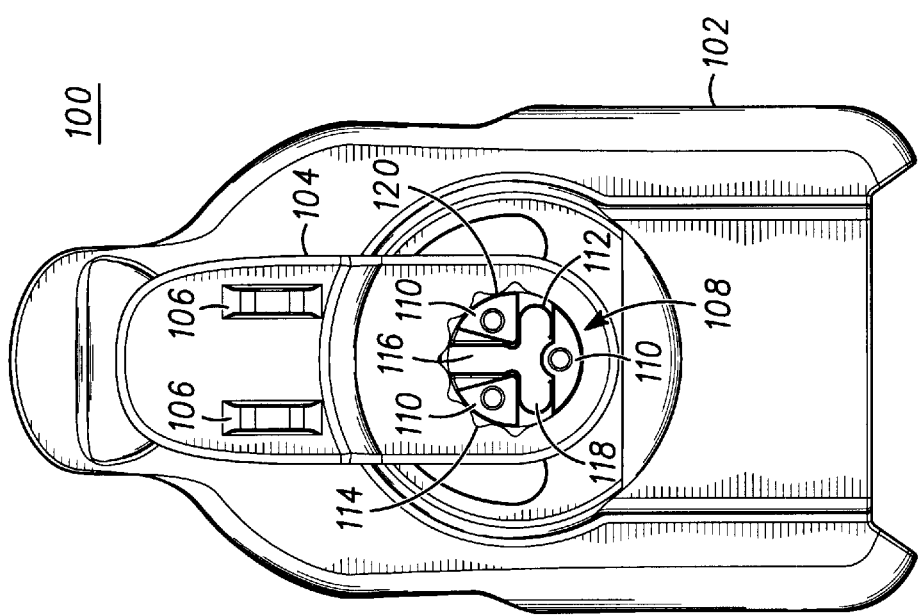
FIG. 1 is a shows a back side of a portion of a prior art holster.

FIG. 2 is an isometric view of a cellular telephone holster 200 in accordance with the present invention. The holster section 200 includes a holster section 202 formed to accept a cellular telephone. A clip portion 204 is rotatably attached to the holster section 202.

A belt clip spring 206 pivotably couples a clip 208 to the clip portion 204. The clip spring 206 provides a force against the clip 208 and the clip portion 204 to bias the clip 208 to a closed position against the holster section 202.

A cover portion 210 is attached to the holster section 202, and the clip portion 204 is situated between the cover 210 and the holster section 202. The cover portion 210 is for holding an opening of the clip portion 204 (shown in a subsequent drawing figure) around a spring system (also shown in a subsequent drawing figure).

Figure 3:
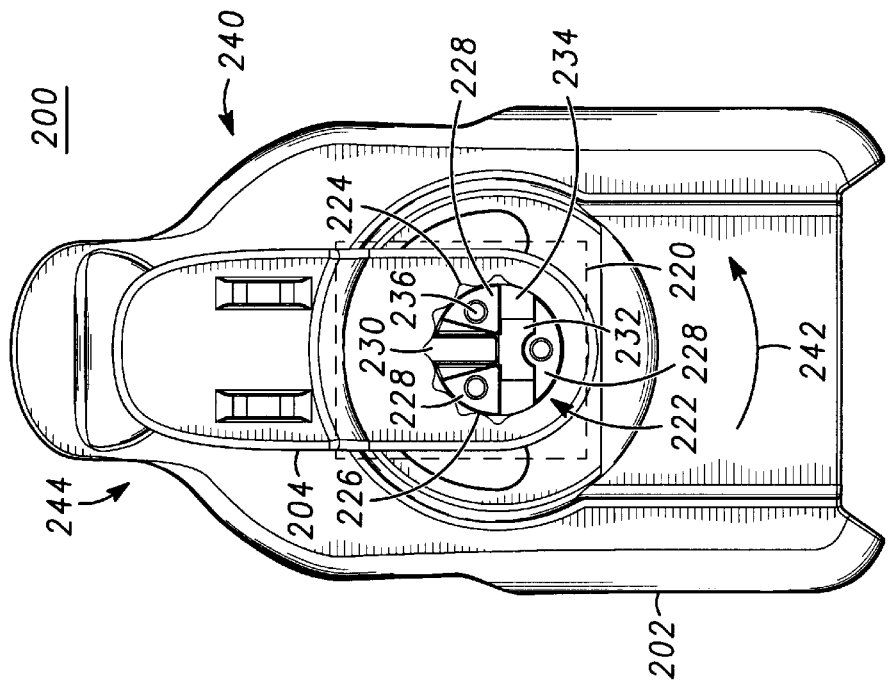
FIG. 3 shows a back side of the cellular telephone holster of FIG. 2 and incorporating a spring system in accordance with the present invention.

FIG. 3 is shows a back side of the cellular telephone holster 200 incorporating a spring system 220 in accordance with the present invention. The clip portion 204 is rotatably attached to the holster section 202 and is formed to have a substantially circular opening 222 with a plurality of detents 224 along an inner perimeter 226 of the opening 222. In FIG. 3, the cover portion 210 (FIG. 2) and the clip 208 (FIG. 2) are not attached so that the spring system 220 is revealed.

The spring system 220 includes a substantially incompressible piston 230 (also referred to as a substantially incompressible tip) and a compressible material 232 separate from and coupled to the substantially incompressible piston 230. The holster section 202 is formed to have a plurality of protrusions 228 that collectively form a protrusion opening 234. The substantially incompressible piston 230 and the compressible material 232 are insertable into the protrusion opening 234. The at least one protrusion 228 serves to assist in holding the substantially incompressible piston 230 and the compressible material 232 in place relative to the holster section 202.

Each of the plurality of protrusions 228 are formed to have a cylindrical opening 236. The cover portion 210 (FIG. 2) has cylindrical pins (not shown so as to not unduly complicate the drawing figures) that are insertable into the cylindrical openings 236. Conventional ultrasonic welding is then used to weld the cylindrical pins into the cylindrical opening. As alluded to previously, the cover portion 210 is for covering the opening 222 and holds the clip portion 204 to the holster section 202. Thus, the cover portion 210 is attached to the holster section 202 and the clip portion 204 is situated between the cover portion 210 and the holster section 202. The cover portion assists in holding the opening 222 (sized to fit around the spring system 220) around the substantially incompressible piston 230, the compressible material 232, and the protrusions 228 of the spring system 220. The substantially incompressible piston 230 is positioned to movably contact the plurality of detents 224.

In operation, a user attaches his cellular telephone (not shown) to the holster section 202 through means known in the art. The user then presents a force on a tip portion 212 of the clip 208 to pivot the clip 208 open relative to the holster section 202. The user then affixes the holster 200 to his belt (purse strap, etc.).

If the user wishes to rotate his cellular phone as it is attached to the belt on the users hip, he or she applies a force to some portion of the cellular phone itself or the holster section 202 near a top portion 240 of the holster section 202. This force must be of a predetermined amount that is sufficient to cause the holster section 202 to rotate with respect to the clip portion 204 that remains substantially stationary (as shown by rotation arrow 242).

Since the protrusions 228 are affixed to the holster section 202, they also rotate along with the holster section 202. The rotation causes the piston 230 to travel along the inner perimeter 226 of the opening 222. The piston 230 is thus moved from its resting position in a first detent. The movement causes a protrusion formed between the first detent and an adjacent, second detent to force the piston 230 into the compressible material 232, thereby compressing the compressible material 232. A further force near section 240 will cause the piston 230 to make contact with the second adjacent detent. As the piston 230 moves into the new position against the second detent, the compressible material 232 expands. If no further force is applied, near section 240, the expansion of the compressible material 232 causes the piston 230 to rest against the second detent, and this holds the cellular telephone/holster section 202 in a rotated position relative to the clip portion 204.

Further force applied near section 240 (FIG. 3) that is sufficient to overcome the force that the expanded compressible material 232 applies to piston 230 will cause a further rotation to move the piston to a next adjacent detent. A force applied near section 244 (FIG. 3) will cause rotation in an opposite direction in a similar fashion. Thus, the compressible material 232 serves as a spring and provides a detent force on the piston 230. Likewise, the piston 230 compresses the compressible material 232 and is actuated by essentially what may be referred to as a pivoting bracket of each of the plurality of detents 224.

Figures 4A, 4B:
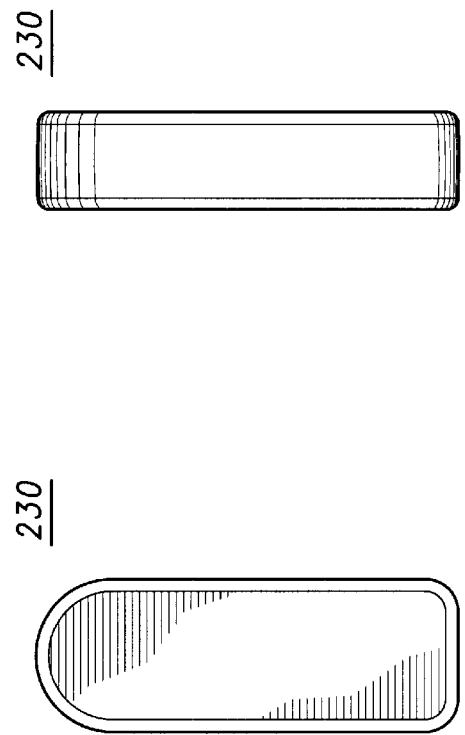

FIG. 4a is a front view of the substantially incompressible piston 230, and FIG. 4b is a side view of the substantially incompressible piston 230. The substantially incompressible piston 230 is composed of a material selected from the group consisting of plastic, metal (e.g. stainless steel), ceramic, and glass.

Figure 5B:
Figure 5A:
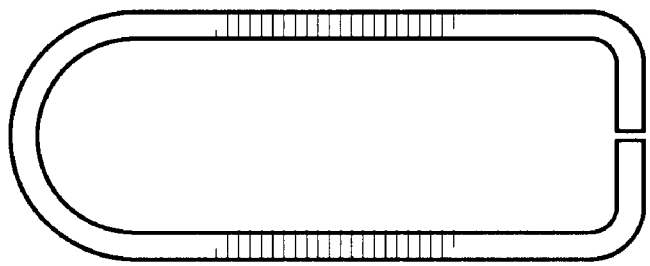
FIG. 5a is a front view of an alternate embodiment of the piston of FIG. 4.

FIG. 5a is a front view of an alternate embodiment piston 260, and FIG. 5b is a side view of the piston 260. The piston 260 is composed of stainless steel and is essentially a wire shaped to form a tip portion.

Figure 6B:
Figure 6A:
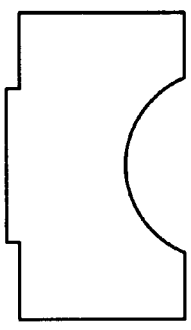
FIG. 6a is a front view of a compressible material for use in the spring system of FIG. 3.
Figure 6C:

FIG. 6a is a front view of the compressible material 232, FIG. 6b is a side view of the compressible material 232, and FIG. 6c is a top view of the compressible material 232. The compressible material 232 is comprised an elastic compound, and the elastic compound can be any of a natural rubber, a synthetic rubber, and a plastic material. The compressible material design allows a variety of spring forces by simply changing the durometer of the material. No dimensional changes of the part are required. Thus, the proper turning resistance for a holster for a large cellular telephone is accomplished using a hard durometer material and a small phone holster uses the same design but with a softer durometer material (e.g. less spring force).

The spring system of the present invention is more reliable than the leaf springs utilized in the prior art. The two-piece system provides the proper functionality, but avoids placing the stresses upon the spring portion of the single leaf spring of the prior art, thereby significantly eliminating fractures in the spring material over the life of the product. In addition, the spring system of the present invention provides more turning resistance than the prior art springs; it provides a resistance on the order of 1.9 in-lbs.

The previous description of the preferred embodiments are provided to enable any person skilled in the art to practice the invention. Various modifications to these embodiments will be readily apparent to those skilled in the art, and the generic principles defined herein may be applied to other embodiments without the use of the inventive faculty. For example, the clip portion can have the protrusions which holds the piston and compressible spring in place, and the holster section can be formed to have the opening to fit over the spring system. A cover portion (cap) would then fasten to the clip portion to sandwich the holster section between the cap and the clip portion. The holster portion and clip portion can more generally thus be referred to as substrate sections.

We claim:

1. A cellular telephone holster comprising:
   a holster section formed to accept a cellular telephone;
   a clip portion rotatably attached to the holster section, the clip portion formed to have an opening with at least one detent along an inner perimeter of the opening; and
   a spring system coupled to the holster section, the spring system including:
      a substantially incompressible piston;
      a compressible body separate from the substantially incompressible piston, the compressible body positioned adjacent to and transversal to one side of the incompressible piston such that movement of the incompressible body exerts a torsion force on the compressible body.

2. The cellular telephone holster as in claim 1 wherein the substantially incompressible piston comprises a material selected from the group consisting of plastic, metal, ceramic, and glass.

3. The cellular telephone holster as in claim 1 further comprising a belt clip spring pivotably coupling a clip to the clip portion.

4. The cellular telephone holster as in claim 1 wherein the opening is a substantially circular opening.

5. The cellular telephone holster as in claim 4 wherein the holster section is formed to have at least one protrusion formed to have a protrusion opening, the substantially incompressible piston and the compressible body insertable into the protrusion opening, whereby the at least one protrusion assists in holding the substantially incompressible piston and the compressible body in place relative to the holster section.

6. The cellular telephone holster as in claim 4 wherein the substantially circular opening is sized to fit around the spring system.

7. The cellular telephone holster as in claim 6 wherein the at least one detent comprises a plurality of detents.

8. The cellular telephone holster as in claim 7 wherein a force of a predetermined amount applied to the holster causes the substantially incompressible piston to travel along the inner perimeter from a first detent towards a second detent, thereby exerting a torsional force compressing the compressible body.

9. A cellular telephone holster comprising:
   a holster section formed to accept a cellular telephone;
   a clip portion rotatably attached to the holster section, the clip portion formed to have an opening with at least one detent along an inner perimeter of the opening; and
   a spring system coupled to the holster section, the spring system including:
      a substantially incompressible piston;
      a compressible material separate from and coupled to the substantially incompressible piston, wherein the compressible material comprises an elastic compound.

10. The cellular telephone holster as in claim 9 wherein the elastic compound is selected from the group consisting of a natural rubber, a synthetic rubber, and a plastic material.

11. A two piece spring system for a cellular telephone clip, the two piece spring system comprising:
   a first substrate section;
   a second substrate section formed to have an opening with at least one detent along an inner perimeter of the opening;
   a substantially incompressible tip positioned to contact the first substrate section and operable to movably contact the at least one detent;
   a compressible block separate from and coupled to the substantially incompressible tip, the compressible block positioned adjacent the tip to exert a force against the tip while the tip moves through the detent.

12. The two piece spring system as in claim 11 wherein:
   the substantially incompressible tip comprises a material selected from the group consisting of plastic, metal, ceramic, and glass; and
   the compressible block comprises an elastic compound.

13. The two piece spring system as in claim 12 wherein the elastic compound is selected from the group consisting of a natural rubber, a synthetic rubber, and a plastic material.

14. The two piece spring system as in claim 11 wherein the opening is sized to fit around the substantially incompressible tip and the compressible block.

15. The two piece spring system as in claim 14 further comprising a cover portion for covering the opening.

16. The two piece spring system as in claim 15 wherein the cover is attached to the first substrate section and the second substrate section is situated between the cover and the first substrate section, the cover for holding the opening of the second substrate section around the substantially incompressible tip and the compressible block.

17. The two piece spring system as in claim 14 wherein the first substrate section is formed to have at least one protrusion, the compressible block positioned adjacent to the at least one protrusion.

18. The two piece spring system as in claim 17 wherein the at least one protrusion forms a protrusion opening, the compressible block insertable in the protrusion opening.

19. A spring system for a rotatable cellular telephone clip, the spring system comprising:
   a first substrate section;
   a second substrate section; and
   spring rotatably coupling the first substrate section with the second substrate section, the spring including,
      a substantially incompressible tip portion formed of any of metal, plastic, ceramic, and glass, and
      a compressible portion coupled to the substantially incompressible tip portion and formed of any of a natural rubber, a synthetic rubber, and plastic.

20. The spring system as in claim 19 wherein the second substrate is formed to have an opening with at least one detent along an inner perimeter of the opening, the spring positionable within the opening.

21. The spring system as in claim 20 wherein the first substrate section comprise one of a cellular telephone housing and a portion of a cellular telephone holster.

22. The spring system as in claim 20 wherein the substantially incompressible tip portion is positioned to movably contact the at least one detent.

* * * * *